UNITED STATES PATENT OFFICE.

EUSTACE CAREY, HOLBROOK GASKELL, JR., AND FERDINAND HURTER, OF WIDNES, COUNTY OF LANCASTER, ENGLAND.

PURIFICATION OF ALKALINE SOLUTIONS OBTAINED IN THE MANUFACTURE OF SODA.

SPECIFICATION forming part of Letters Patent No. 258,850, dated May 30, 1882.

Application filed December 15, 1881. (No specimens.) Patented in England February 11, 1880, No. 608.

*To all whom it may concern:*

Be it known that we, EUSTACE CAREY, HOLBROOK GASKELL, the younger, and FERDINAND HURTER, subjects of the Queen of Great Britain, and residing at Widnes, in the county of Lancaster, England, have invented certain Improvements in the Purification of Alkaline Solutions and in the Production of Ammonia, (for which we have obtained a patent in Great Britain, No. 608, dated the 11th day of February, 1880,) of which the following is a specification.

Our said invention relates to improvements in the process for the purification of alkaline solutions in respect of which British Letters Patent were granted to us bearing date the 18th July, 1879, No. 2,939; and it consists in subjecting such alkaline solutions to the action of carbonic acid and of certain sulphur compounds produced in the said alkaline solutions by the addition of manganese oxide, sodium nitrate, or other suitable oxygen compounds, in order that the silica, alumina, and iron contained in the said solutions may be separated therefrom.

Our said invention also relates to the production of ammonia by or during such improved process of treating alkaline solutions.

In carrying out our said invention we proceed in the following manner, viz: We first subject the alkaline solutions containing ferrocyanides and sulphur compounds, as well as other impurities, to the action of carbonic acid, (which may or may not be mixed with atmospheric air,) whereby we remove as far as possible the silica and alumina usually found in those solutions, and thus prevent or greatly diminish the incrustation or deposit in the boiler in which the solutions are to be subsequently treated, as hereinafter described. To the solutions so carbonated and freed as far as possible from silica and alumina we add an oxidizing agent consisting of an oxygen compound—such, for example, as peroxide of manganese or nitrite of soda, or any other oxide capable of converting the sodium monosulphide into sodium thiosulphate, (hyposulphite,) either at the ordinary temperature or at a higher one, not exceeding, however, the temperature to which the solutions have to be afterward subjected.

When using manganese as an oxidizing agent, and operating in the manner hereinbefore described, we add the manganese in sufficient quantity to produce at once the required amount of thiosulphate, (hyposulphite;) or we may add the manganese in insufficient quantity before the solution is carbonated, and then subject the solution to the action of carbonic acid, which in this case is mixed with a sufficient quantity of oxygen to produce a further quantity of thiosulphate, the manganese acting then simply as a carrier of oxygen to the monosulphide. In either case we settle or filter the solution, and may recover the manganese and use it for a further operation. When using sodium nitrate we add it to the filtered or settled carbonated solution in sufficient quantity to yield the necessary amount of thiosulphate. On the solutions being subjected to an elevated temperature, as hereinafter described, the following reaction occurs between the sodium nitrate and the sodium monosulphide: $2Na_2S + NaNo_3 + 2H_2O = Na_2O + NaHO + Na_2S_2O_3 + NH_3$. Thus we have to employ for every equivalent of thiosulphate which we wish to produce at least one equivalent of sodium nitrate. In whatever way, however, the sodium thiosulphate be produced, there must be so much thereof as is sufficient to decompose the whole of the ferrocyanide present in the solution. We find that for this purpose at least from five to six equivalents of thiosulphate are necessary to decompose one equivalent of ferrocyanide; or for every part of anhydrous ferrocyanide, by weight, which the solution contains there must be present from 2.6 to 3.2 parts, by weight, of anhydrous thiosulphate, as most of the ferrocyanide splits up according to the following equation: $Na_4FeCy_6 + 6Na_2S_2O_3 + Na_2O = 6NaCyS + 6Na_2SO_3 + FeO$.

Having thus prepared the solutions, we subject them afterward to the action of heat in a boiler, preferably a tubular one. The boiler described in the specification to our said former Letters Patent is suitable for this purpose. The temperature necessary for this decomposition is at least 350° Fahrenheit. If this temperature is not attained or surpassed no decomposition will take place. It is clear that in order to prevent evaporation of the solutions before they attain this temperature they should be kept under suitable pressure. We obtain this pressure for forcing the liquid against a loaded valve which opens only when the liquid is under a pressure of from two hundred to three hundred pounds per square inch. The solution, when leaving this boiler, may then be freed from the iron, which has been precipitated by filtering or settling, and is ready for use in the manufacture of refined alkali soda crystals, or any other form of soda in which freedom from silica, alumina, and iron is desirable. During the heating of these solutions, particularly when nitrate of soda is used, ammonia is evolved.

The ammonia, which arises partly from the decomposition of the sodium ferrocyanide and partly from the decomposition of the sodium nitrate, may be recovered by any well-known method.

Having now described and particularly ascertained the nature of our said invention and the manner in which the same is or may be used or carried into effect, we would observe, in conclusion, that what we consider to be novel and original, and therefore claim as the invention, is—

1. The method of purifying alkaline solutions by oxidizing the sulphur compounds therein with the aid of manganese oxide, sodium nitrate, or other suitable oxygen compound, and then heating the liquor to a high temperature, as indicated, to cause the double decomposition of the said oxidized sulphur compounds and the cyanogen compounds in the liquor, substantially as described.

2. In the purification of alkaline liquor, the production of ammonia by the decomposition of nitrogen compounds—such as ferrocyanides and nitrates—during the heating of the liquor, and recovery of the ammonia produced, substantially as described.

In testimony whereof we have signed our names to this specification in the presence of two subscribing witnesses.

EUSTACE CAREY.
   HOLBROOK GASKELL, JR.
   FERDINAND HURTER.

Witnesses:
 E. H. PERRIN,
 J. E. PERRIN,
   *Both of Exchange Street, Liverpool.*